United States Patent [19]

Espy

[11] 3,728,215

[45] Apr. 17, 1973

[54] AMINOPALYAMIDE—ACRYLAMIDE—POLYALDEHYDE RESINS EMPLOYING AN ALPHA, BETA-UNSATURATED MONOBASIC CARBOXYLIC ACID OR ESTER TO MAKE THE AMINOPOLYAMIDE AND THEIR UTILITY AS WET AND DRY STRENGTHENING AGENTS IN PAPERMAKING

[75] Inventor: Herbert H. Espy, Wilmington, Del.

[73] Assignee: Hercules Incorporated, Wilmington, Del.

[22] Filed: Mar. 12, 1971

[21] Appl. No.: 123,864

[52] U.S. Cl..............162/167, 162/164, 260/2 EP, 260/17.3 R, 260/29.4 R, 260/29.4 UA, 260/72 R
[51] Int. Cl..........................D21h 3/58, C08g 9/02
[58] Field of Search................162/167, 168, 164; 260/72 R, 29.4 R, 29.4 UA, 2 EP, 17.3 R

[56] References Cited

UNITED STATES PATENTS

| 3,607,622 | 9/1971 | Espy | 162/167 |
| 3,556,932 | 1/1971 | Coscia et al. | 162/166 |
| 2,886,557 | 5/1959 | Talet | 260/72 R |
| 3,594,272 | 7/1971 | Shen | 260/72 R |
| 3,420,735 | 1/1969 | Conte et al. | 260/72 R X |
| 2,926,116 | 2/1960 | Keim | 162/164 |

Primary Examiner—S. Leon Bashore
Assistant Examiner—Frederick Frei
Attorney—Charles L. Board

[57] ABSTRACT

Disclosed are novel aminopolyamide—acrylamide—polyaldehyde resins useful in the paper making art to enhance the wet and dry strength of paper. The aminopolyamide results from the condensation of a polyalkylene polyamine with an alpha, beta-unsaturated monobasic carboxylic acid or ester.

18 Claims, No Drawings

AMINOPALYAMIDE—ACRYLAMIDE—POLYALDEHYDE RESINS EMPLOYING AN ALPHA, BETA-UNSATURATED MONOBASIC CARBOXYLIC ACID OR ESTER TO MAKE THE AMINOPOLYAMIDE AND THEIR UTILITY AS WET AND DRY STRENGTHENING AGENTS IN PAPERMAKING

This invention relates to wet strength resins, the process of incorporating them into paper and the paper so treated.

Various resins which impart wet strength to paper are known in the art. However, most of the prior art resins are of the permanent type, i.e., paper treated with them retains its wet strength long after immersion in water, which is desirable in packaging materials but presents a disposal problem. A few resins are known which impart temporary wet strength and would thus be suitable for sanitary or disposable paper uses, but each of them suffers from one or more serious drawbacks. For example, their wet strength efficiency is seriously decreased by alum, they are easily attacked by mold and slime, they can only be prepared as dilute suspensions or they must be applied to preformed paper because cause they are not substantive to pulp. Some resins impart dry strength but very little wet strength, while others improve wet strength more than they improve dry strength.

It is an object of this invention to provide resins which impart about 0.2 to about 1 pound/inch wet tensile strength for each pound/inch increment in dry tensile strength.

It is a further object of this invention to provide wet strength resins such that paper treated with them loses strength on prolonged immersion in water such as on disposal in sanitary systems, and facilitates the handling of broke in the paper mill.

It is a further object of this invention to provide resins which impart their ultimate wet strength on drying alone without curing and are substantive to pulp without sizing.

It is a further object of this invention to provide wet strength resins which can be prepared in high solids concentrations.

It is a further object of this invention to provide wet strength resins which are not easily attacked by mold and slime growth.

It is a further object of this invention to provide wet strength resins which are more stable towards gelation on storage.

It is a further object of this invention to provide wet strength resins whose efficiency is not seriously reduced by alum.

Now in accordance with this invention these objectives and many others have been achieved by preparing wet strength resins from an aminopolyamide, an acrylamide and a polyaldehyde.

The wet strength resins of this invention are prepared by (1) reacting an aminopolyamide, Containing primary and/or secondary amine groups, with an acrylamide and (2) reacting the resulting adduct with a polyaldehyde.

Any aminopolyamide containing at least one primary or secondary amine group and resulting from the condensation of a polyalkylene polyamine with an alpha, beta-unsaturated monobasic carboxylic acid can be used in preparing the resins of this invention. The polyalkylene polyamines which can be used to prepare the aminopolyamides will have the general formula

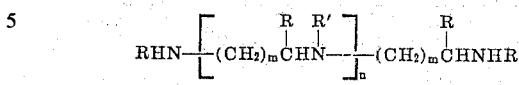

or

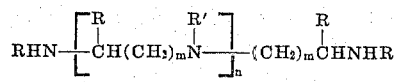

where $m$ is an integer from 1 to 5, $n$ is at least 1, each R independently of each other is selected from the group consisting of hydrogen and lower alkyl radicals and R' is selected from the group consisting of hydrogen and amino substituted lower alkyl radicals. Typical polyalkylene polyamines are diethylenetriamine, dipropylenetriamine, triethylenetetraamine, tetraethylenepentaamine, pentaethylenehexaamine, bis(3-aminopropyl)amine, bis(3-aminopropyl)ethylenediamine, bis(2-aminoethyl)-1,3-diaminopropane, bis(3-aminopropyl)-1,3-diaminopropane, $N^1,N^3$-dimethyl-diethylenetriamine, tris-(2-aminoethyl)amine, and polyethyleneimine.

Typical of the alpha,beta-unsaturated monobasic carboxylic acids which can be used in the preparation of these compounds are the alpha,beta-unsaturated aliphatic monobasic carboxylic acids such as acrylic, methacrylic, crotonic, isocrotonic, tiglic, angelic, senecioic and hexenic. It will be understood that esters, such as the methyl, ethyl, propyl, butyl, amyl, hexyl, cycloheptyl, cyclohexyl and benzyl esters of the above acids can be reacted with the above polyalkylene polyamines to give equivalent aminopolyamides.

The condensation reaction can be carried out by heating the polyalkylene polyamine with the alpha,beta-unsaturated monobasic acid at a temperature of from about 110° C. to about 250° C. Optionally the reaction will be carried out in a diluent to aid in mixing and absorb the heat of neutralization of the acid by the amine. Care should be taken not to use too great an excess of acid less irreversible gelation of the polyamide occur and all the amine groups be converted to amides with no amine left for later reaction. In general from about 0.5 to about 2.0, preferably from about 1.0 to about 1.3 moles of polyalkylene polyamine per mole of acid will be used. The course of the reaction can be followed by monitoring the melt viscosity. The reaction will ordinarily be continued until the reduced specific viscosity of the polyamide lies in the range of 0.05 to 0.5. Reduced specific viscosity is defined herein as $\eta sp/c$ measured at 25° C. in aqueous one molar ammonium chloride, where $c = 2.0$ percent (2 g./100 ml.).

If desired the aminopolyamide condensate can optionally be reacted with an epoxide. Typical epoxides which can be reacted with the above aminopolyamides are the epihalohydrins such as epichlorohydrin, epifluorohydrin, epibromohydrin and epiiodohydrin; and the diepoxides such as butadiene diepoxide, 1,2-4,5-diepoxypentane, 1,2-5,6-diepoxyhexane and 4-(epoxyethyl)-1,2-epoxycyclohexane. In general from about 0.5 to about 3.0, preferably from about 1.0 to about 1.3 moles of epoxide per mole of aminopolyamide will be used. The reaction can be carried out in a diluent at room temperature up to about 100° C., preferably from about 40° C. to about 80° C. When reacting with an epihalohydrin, chain extension is obtained if the reaction is rendered basic to neutralize HCl formed from amine chlorohydrin reactions. It should be pointed out that reaction with an epoxide is not essential to the process of this invention and excellent results are achieved when using resins which have not been so reacted.

As stated above, in the preparation of the resins of this invention the aminopolyamide is reacted with an acrylamide, including substituted acrylamides such as methacrylamide, $\alpha$-ethylacrylamide, and crotonamide. Most preferably, a sufficient amount of the acrylamide will be used to react with substantially all of the amine groups in the aminopolyamide. In practice an excess of acrylamide helps to drive the carbamidoethylation of the amines to a substantial completion in a reasonable time. The reaction between the aminopolyamide and acrylamide can be carried out any any temperature between about 20° C. and the boiling point of the reaction mixture at the solids concentration used. Temperatures between about 60° C. and about 110° C. are most preferred. A high pH during the reaction is favored since this frees the amine groups from their salts. Ordinarily the natural pH of the aminopolyamide solution is satisfactory but it may be adjusted if necessary.

The final reaction in the preparation of the wet strength resins of this invention is between the aminopolyamide—acrylamide adduct and a polyaldehyde. Typical polyaldehydes which may be used in the final reaction are glyoxal, malonic aldehyde, succinic aldehyde, glutaraldehyde, adipic aldehyde, 2-hydroxyadipaldehyde, pimelic aldehyde, suberic aldehyde, azelaic aldehyde, sebacic aldehyde, maleic aldehyde, fumaric aldehyde, dialdehyde starch, polyacrolein, phthalaldehyde, isophthalaldehyde, terephthalaldehyde, 1,3,5-triformylbenzene, and 1,4-diformylcyclohexane. This reaction is generally carried out at a pH of from about 5 to about 10 and a temperature in the range of from about 20° to about 80° C. Mole ratios of polyaldehyde to acrylamide in the aminopolyamide—acrylamide adduct will be between about 0.05 and about 5.0, most preferably between about 0.1 to about 3.0 The resulting wet strength resin will have a Brookfield viscosity of from about 5 cps. to about 200 cps. as determined on a Brookfield Model LVF viscometer using a No. 1 spindle rotating at 60 or 12 rpm.

When using the wet strength resins of this invention in papermaking, they can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking it will be preferred to add the resin at the fan pump or head box in the form of an aqueous solution of up to 15 percent solids. Various amounts of the resin can be used. When used to impart wet strength, the amount of resin added will be sufficient to result in a paper containing from about 0.05 percent to about 5 percent by weight based on the weight of the paper. The actual amount of any specific purpose can be easily determined by one skilled in the art. As stated above, no heat curing is required with the resins of the instant invention since they develop their optimum strength on normal drying. They can be added to paper over a wide range of pH values. However, best results are obtained by adding the resin to the paper at an acid pH of from about 1 to about 8, most preferably from about 3 to about 6.

Other ingredients can be used in conjunction with the wet strength resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the wet strength resins of this invention.

It will be obvious to those skilled in the art that the wet strength resins of this invention can be incorporated into various types of paper such as kraft paper, sulfite paper, semichemical paper, etc. both bleached and unbleached. While the resins can be used in various types of paper, their advantages will be most sought in paper toweling or paper tissues such as toilet and facial tissues.

The following example will serve to illustrate the invention, parts and percentages being by weight unless otherwise indicated.

The resin treated papers in the following examples are tested for wet and dry strength and the results compared to control paper not treated with resin. The results of the tests are expressed in terms of the ratio of wet strength increment to dry strength increment. Wet strength increment refers to the increase in wet tensile strength in lbs./inch width over the wet tensile strength of the control. Dry strength increment refers to the increase in dry tensile strength in lbs./inch width over the dry tensile strength of the control.

EXAMPLE 1

This example shows the preparation of and use in paper-making of a typical wet strength resin in accordance with this invention.

To a mixture of 154.8 parts of diethylenetriamine and 157.7 parts of methanol is added 129 parts of methyl acrylate. The resulting mixture is heated at reflux for 1 hour, then heated to 150° C. and held there for 32 minutes while 190.4 parts of distillate is collected. At the end of this time the mixture is cooled and diluted with about 200 parts of hot water to give a 50.6 percent solids solution. The aminopolyamide has a reduced specific viscosity of about 0.073. To 124.2 parts of the above solution is added 56.9 parts of acrylamide. The resulting mixture is heated to 91° C. and held there for two hours and then cooled. The thus cooled solution contains about 67.7 percent total solids. To 66.4 parts of the above aminopolyamide—acrylamide adduct solution is added 45.8 parts of water and the pH adjusted to 7.5 with sulfuric acid. To the thus acidified solution is added 43.5 parts of 40 percent aqueous glyoxal and the resulting mixture heated to 55° C. for 155 minutes. The resin solution is adjusted to a pH of 5.0 and had a total solids of 40.2 percent. After storage for 90 days at room temperature a sample of the wet strength resin solution shows no signs of mold or slime.

Rayonier bleached kraft pulp is beaten in a cycle beater to a Schopper-Riegler freeness of 750 cc. Portions of this pulp, adjusted to a pH of 4.5 with sulfuric acid, are added to the proportioner of a Noble-Wood handsheet forming machine. A sample of the above wet strength resin is added to the proportioner in an amount of 2 percent resin solids by weight of pulp solids. The pulp is then formed into handsheets of about 40 pounds per 3,000 square foot basis weight and dried for one minute at a temperature of 110° C. A control handsheet is prepared exactly as described above except it contains no wet strength resin. The resulting handsheets after conditioning at a temperature of 75° F. and 50 percent relative humidity for over 24 hours are tested for dry tensile strength and wet tensile strength after soaking for 10 seconds in distilled water. The wet tensile strength is in excess of twice that of the control. The ratio of wet strength increment to dry strength increment is 0.5.

EXAMPLE 2

This example shows the preparation and use of another typical wet strength resin.

A mixture of 114.1 parts of ethyl crotonate, 160 parts of ethanol, 103.1 parts of diethylenetriamine and 0.5 part of sodium ethoxide is heated at reflux for three hours, then heated to 170° C. and held there for 2 hours with concomitant distillation of ethanol. The diethylenetriamine—crotonate condensate is decanted and allowed to cool. To a solution of 34.2 parts of the condensate in 115 parts of water is added 42.6 parts of acrylamide and the mixture heated at 80° C. for 2 hours. The resulting solution is cooled, adjusted to a pH of 7.5 and treated with 87 parts of 40 percent aqueous glyoxal. This mixture is heated to 50° C. and held between 40–50° C. for 30 minutes, cooled, diluted with water to about 10 percent total solids and its pH adjusted to 5.0 with sulfuric acid. After storage for 90 days at room temperature a sample of the wet strength resin solution shows no signs of mold or slime.

Bleached kraft paper is prepared using the above wet strength resin as described in Example 1. Samples of the thus prepared paper are tested for dry and wet strength also as described in Example 1. The wet tensile strength of the sample treated with the above resin is in excess of twice that of the control. The ratio of wet strength increment to dry strength increment is approximately 0.9.

EXAMPLE 3

This example shows the preparation and use of a wet strength resin treated with a diepoxide.

To a mixture of 206.3 parts of diethylenetriamine and 250 parts of methanol is added 86 parts of methyl acrylate. The resulting mixture is heated at reflux for 2 hours, then heated to 150°–155° C. and held there for 1 hour with concomitant distillation of methanol. The diethylenetriamine—acrylate condensate is decanted and allowed to cool. To a solution of 52 parts of the above condensate in 108 parts of water is added dropwise 17.2 parts of a mixture of the 1–2 and 3–4 isomers of diepoxybutane. After warming this mixture to 35–40° C. for 30 minutes, 71.1 parts of acrylamide is added and the whole heated at 70° C. for an additional 2 hours. The resulting solution is cooled, the pH adjusted to 7.7 with sulfuric acid and then treated with 400 parts of 25 percent aqueous glutaraldehyde. The resulting mixture is heated to 50° C. and maintained at 50°–55 C. for 60 minutes. The resulting wet strength resin solution is diluted with approximately 950 parts of water and its pH adjusted to 5.0 with sulfuric acid. The resulting product contains approximately 14.9 percent solids. After storage for 90 days at room temperature, a sample of the product shows no signs of mold or slime.

Bleached kraft paper is prepared from the above-described wet strength resin as described in Example 1. Wet and dry strength tests are carried out also as described in Example 1. The wet tensile strength of the sample treated with the above resin is in excess of twice that of the control. The ratio of wet strength increment to dry strength increment is approximately 0.6.

EXAMPLE 4

This example shows the preparation and use of a wet strength resin treated with an epihalohydrin.

To a mixture of 292 parts of tetraethylenepentamine and 300 parts of methanol is added 86 parts of methyl acrylate. The reaction mixture is heated at reflux for 1.5 hours, then heated to a temperature of 150° C. for one hour with concomitant distillation of methanol. To a solution of 34.6 parts of the above triethylenetetramine—acrylate condensate in 103.8 parts of water is added 9.25 parts of epichlorohydrin, followed by 13 parts of 30 percent aqueous sodium hydroxide. The resulting mixture is heated 30 minutes at 40°–50° C. then treated with 56.9 parts of acrylamide and heated at 70°–75° C. for 2 hours. The resulting solution of triethylenetetramine—acrylate—epichlorohydrin—acrylamide condensate is adjusted to a pH of approximately 7.5 with sulfuric acid and then treated with 145 parts of 40 percent aqueous glyoxal. The resulting mixture is heated at 40°–50° C. for 35 minutes. The resin product is diluted with 690 parts of water, cooled to 25° C. and adjusted to a pH of 5.0 with sulfuric acid. The final resin product solution has a total solids content of approximately 16 percent. After storage for 90 days at room temperature, a sample of the resin product solution shows no signs of mold or slime.

Bleached kraft paper is prepared using the above wet strength resin as described in Example 1. Samples of the thus prepared paper are tested for wet and dry strength, also as described in Example 1. The wet tensile strength of the sample treated with the above resin is in excess of twice that of the control. The ratio of wet strength increment to dry strength increment is approximately 0.8.

EXAMPLE 5

This example shows the preparation of another typical wet strength resin.

To a mixture of 103 parts of diethylenetriamine and 100 parts of water is added 72 parts of acrylic acid. The resulting mixture is heated at reflux for one hour, then heated slowly to 155°–164° C. and held there for 1½ hours with concomitant distillation of water. The resulting aminopolyamide condensate is decanted and allowed to cool. A solution of 31.8 parts of the aminopolyamide condensate and 31.3 parts of water is treated with 28.5 parts of acrylamide, heated to 90° C., maintained there for 2 hours and then cooled. The resulting solution is diluted with 54 parts of water, adjusted to pH 7.5 with sulfuric acid and treated with 58.1 parts of 40 percent aqueous glyoxal. The resulting mixture is heated to 55° C. for 35 minutes, diluted with water to about 15 percent total solids and adjusted to pH 5.0 with sulfuric acid. After storage for 90 days at room temperature, a sample of the resin product solution shows no signs of mold or slime.

Bleached kraft paper is prepared using the above wet strength resin as described in Example 1. Samples of the thus prepared paper are tested for wet and dry strength, also as described in Example 1. The wet tensile strength of the sample treated with the above resin is in excess of twice that of the control. The ratio of wet strength increment to dry strength increment is approximately 0.6.

What I claim and desire to protect by Letters Patent is:

1. An aminopolyamide--acrylamide--polyaldehyde resin prepared by reacting
   1. an aminopolyamide, resulting from the condensation of
      a. a polyalkylene polyamine having the general formula selected from

and

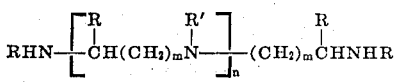

where each R independently of each other is selected from hydrogen and lower alkyl radicals, R' is selected from hydrogen and amino substituted lower alkyl radicals, $m$ is an integer from 1 to 5 and $n$ is at least 1 with
      b. an alpha, beta-unsaturated monobasic carboxylic acid or ester in a ratio of from about 0.5 to about 2.0 moles of polyalkylene polyamine per mole of acid or ester with
   2. an amount of unsaturated amide, selected from the group consisting of acrylamide and lower alkyl substituted acrylamides, sufficient to react with substantially all of the amine groups in the aminopolyamide and
   3. reacting the resulting aminopolyamide—unsaturated amide adduct with from about 0.05 to about 5.0 moles of an organic compound containing at least two free aldehyde groups per mole of unsaturated amide present in said adduct.

2. The product of claim 1 wherein the aminopolyamide condensate is reacted with from about 0.5 to about 3.0 moles of an epoxide, selected from the groups consisting of epihalohydrin and diepoxides, per mole of aminopolyamide, before it is reacted with the unsaturated amide.

3. The product of claim 1 wherein the aminopolyamide is the reaction product of the condensation reaction of diethylenetriamine with methyl acrylate.

4. The product of claim 1 wherein the aminopolyamide is the reaction product of the condensation reaction of tetraethylenepentamine with methyl acrylate.

5. The product of claim 1 wherein the aminopolyamide is the reaction product of the condensation reaction of diethylenetriamine with ethyl crotonate.

6. The product of claim 1 wherein the organic compound containing at least two free aldehyde groups is glyoxal.

7. The product of claim 1 wherein the organic compound containing at least two free aldehyde groups is glutaraldehyde.

8. The process of preparing an aminopolyamide—acrylamide—polyaldehyde resin which comprises the steps of
   1. reacting an aminopolyamide, resulting from the condensation of
      a. a polyalkylene polyamine having the general formula selected from

and

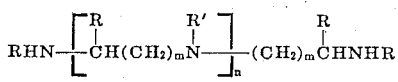

where each R independently of each other is selected from hydrogen and lower alkyl radicals, R' is selected from hydrogen and amino substituted lower alkyl radicals, $m$ is an integer from 1 to 5 and $n$ is at least 1 with
      b. an alpha, beta-unsaturated monobasic carboxylic acid or ester in a ratio of from about 0.5 to about 2.0 moles of polyalkylene polyamine per mole of acid or ester with
   2. an amount of unsaturated amide, selected from the group consisting of acrylamide and lower alkyl substituted acrylamides, sufficient to react with substantially all of the amine groups in the aminopolyamide and
   3. reacting the resulting aminopolyamide—unsaturated amide adduct with from about 0.05 to about 5.0 moles of an organic compound containing at least two free aldehyde groups per mole of unsaturated amide present in said adduct.

9. The process of claim 8 wherein the aminopolyamide condensate is reacted with from about 0.5 to about 3.0 moles of an epoxide, selected from the group consisting of epihalohydrins and diepoxides, per mole of aminopolyamide, before it is reacted with the unsaturated amide.

10. The process of claim 8 wherein the polyalkylene polyamine is a polyethylene polyamine.

11. The process of claim 8 wherein the alpha, beta-unsaturated monobasic carboxylic acid ester is methyl acrylate.

12. The process of claim 8 wherein the alpha, beta-unsaturated monobasic carboxylic acid ester is ethyl crotonate.

13. The process of claim 8 wherein the unsaturated amide is acrylamide.

14. The process of claim 8 wherein the organic compound containing at least two free aldehyde groups is glyoxal.

15. A paper treating composition comprising an aqueous solution of up to 15 percent solids by weight based on the weight of the water of the aminopolyamide—acrylamide—polyaldehyde resin of claim 1.

16. Paper treated with from about 0.05 to 5 percent by weight based on the weight of the paper of the aminopolyamide—acrylamide—polyaldehyde resin of claim 1 to impart wet strength.

17. The process of treating paper to impart wet strength which comprises treating said paper with from about 0.05 percent to about 5 percent by weight based on the weight of the paper of the aminopolyamide—acrylamide—polyaldehyde resin of claim 1 and allowing the treated paper to dry.

18. The process of claim 17 wherein said treating is conducted during the formation of said paper.

* * * * *